United States Patent
Zhao

(10) Patent No.: US 12,490,287 B2
(45) Date of Patent: Dec. 2, 2025

(54) WIRELESS COMMUNICATION METHOD AND TERMINAL DEVICE

(71) Applicant: GUANGDONG OPPO MOBILE TELECOMMUNICATIONS CORP., LTD., Dongguan (CN)

(72) Inventor: Zhenshan Zhao, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 387 days.

(21) Appl. No.: 18/088,694

(22) Filed: Dec. 26, 2022

(65) Prior Publication Data

US 2024/0090009 A1    Mar. 14, 2024

Related U.S. Application Data

(63) Continuation of application No. PCT/CN2020/111154, filed on Aug. 25, 2020.

(51) Int. Cl.
*H04W 72/541* (2023.01)
*H04W 72/0446* (2023.01)
(Continued)

(52) U.S. Cl.
CPC ..... *H04W 72/541* (2023.01); *H04W 72/0446* (2013.01); *H04W 72/25* (2023.01); *H04W 72/566* (2023.01)

(58) Field of Classification Search
CPC ........... H04W 72/541; H04W 72/0446; H04W 72/25; H04W 72/566; H04W 72/02;
(Continued)

(56) References Cited

U.S. PATENT DOCUMENTS

2016/0338094 A1* 11/2016 Faurie .................. H04W 72/04
2020/0267523 A1    8/2020 Tang et al.
(Continued)

FOREIGN PATENT DOCUMENTS

CN    105594151 A    5/2016
CN    110831160 A    2/2020
(Continued)

OTHER PUBLICATIONS

International Search Report and Written Opinion dated May 19, 2021 in International Application No. PCT/CN2020/111154. English translation attached.
(Continued)

*Primary Examiner* — Rina C Pancholi
(74) *Attorney, Agent, or Firm* — Sheppard, Mullin, Richter & Hampton LLP

(57) ABSTRACT

The present disclosure provides a wireless communication method and a terminal device, capable of avoiding data transmission problems caused by hidden nodes and half-duplex in sidelink transmission. The method includes: receiving, by a first terminal, first information transmitted by a second terminal. The first information is used by the first terminal to determine a resource for sidelink transmission. The first information includes at least one of: resource indication information indicating at least one transmission resource; time slot indication information indicating a reference time slot for the at least one transmission resource, or a time slot position of a resource selection time window corresponding to the at least one transmission resource; or a signal quality threshold used for determining a reference quality threshold for the at least one transmission resource.

18 Claims, 4 Drawing Sheets

(51) Int. Cl.
*H04W 72/25* (2023.01)
*H04W 72/566* (2023.01)

(58) Field of Classification Search
CPC .... H04W 76/14; H04W 4/70; H04L 27/2602;
H04L 5/0033; H04L 5/0064; H04L
5/0082; H04L 5/0091; H04L 5/16; H04L
5/001; H04L 5/0026
See application file for complete search history.

(56) References Cited

U.S. PATENT DOCUMENTS

| | | | | |
|---|---|---|---|---|
| 2021/0400639 A1* | 12/2021 | Lee | ............... | H04W 24/10 |
| 2022/0015065 A1* | 1/2022 | Wang | ............... | H04W 72/0446 |
| 2022/0053490 A1* | 2/2022 | Zhang | ............... | H04W 72/0446 |
| 2022/0377726 A1* | 11/2022 | Son | ............... | H04W 72/20 |
| 2023/0143285 A1* | 5/2023 | Li | ............... | H04W 76/14 |
| | | | | 370/329 |

FOREIGN PATENT DOCUMENTS

| | | |
|---|---|---|
| CN | 110891311 A | 3/2020 |
| CN | 110958586 A | 4/2020 |
| CN | 111278108 A | 6/2020 |
| CN | 111385765 A | 7/2020 |
| EP | 3905733 A1 | 11/2021 |
| WO | 2020091494 A1 | 5/2020 |
| WO | 2020092939 A | 5/2020 |
| WO | 2020134902 A1 | 7/2020 |

OTHER PUBLICATIONS

Fujitsu. "Considerations on Inter-UE Coordination for Mode 2 Enhancements", 3GPP TSG RAN WG1 #102-e R1-2005546, Aug. 7, 2020 (Aug. 7, 2020), sections 1-5.
Spreadtrum Communications. "Discussion on Feasibility and Benefit of Mode 2 Enhancements", 3GPP TSG RAN WG1 #102-e R1-2006268, Aug. 8, 2020 (Aug. 8, 2020), sections 1-3.
ZTE et al. "Inter-UE Coordination in Mode-2", 3GPP TSG RAN WG1 #102-e R1-2005961, Aug. 7, 2020 (Aug. 7, 2020), sections 1-3.
TCL Communication. "Feasibility and Benefits for Mode 2 Enhancements", 3GPP TSG RAN WG1 #102-e R1-2005774, Aug. 7, 2020 (Aug. 7, 2020-), sections 1-5.
Futurewei, "Views on resource allocation enhancements for sidelink communication", 3GPP TSG RAN WG1 Meeting #102-e R1-2005296, Aug. 17, 2020 (Aug. 17, 2020).
VIVO, "Discussion on mode 2 enhancements", 3GPP TSG RAN WG1 #102-e R1-2005404, Aug. 17, 2020 (Aug. 17, 2020).
LG Electronics, "Discussion on feasibility and benefits for mode 2 enhancement", 3GPP TSG RAN WG1 Meeting #102-e R1-2005749, Aug. 17, 2020 (Aug. 17, 2020).
Lenovo, Motorola Mobility, "Sidelink resource allocation for Reliability enhancement", 3GPP TSG RAN WG1 #102-e R1-2005840, Aug. 17, 2020 (Aug. 17, 2020).
Robert Bosch GmbH, "Sidelink Resource Allocation Enhancements", 3GPP TSG RAN WG1 #102-e R1-2006876, Aug. 17, 2020 (Aug. 17, 2020).
CMCC, "Discussion on reliability and latency enhancements for mode-2 resource allocation", 3GPP TSG RAN WG1 #102-e R1-2006231, Aug. 17, 2020 (Aug. 17, 2020).
Ericsson,"Feasibility and benefits of mode 2 enhancements for inter-UE coordination", 3GPP TSG-RAN WG1 Meeting #102-e R1-2006445, Aug. 17, 2020 (Aug. 17, 2020).
NTT Docomo, Inc., "Discussion on sidelink resource allocation for reliability and latency enhancements", 3GPP TSG RAN WG1 #102 R1-2006748, Aug. 17, 2020 (Aug. 17, 2020).
Qualcomm Incorporated, "Reliability and Latency Enhancements for Mode 2", 3GPP TSG RAN WG1 Meeting #102-e R1-2006829, Aug. 17, 2020 (Aug. 17, 2020).
Second Office Action issued by China Patent Office for Application No. 202310279170.7 mailed on Nov. 30, 2024.
First Office Action issued by China Patent Office for Application No. 202310279170.7 mailed on Aug. 29, 2024.
TCL Communication, "Feasibility and benefits for Mode 2 enhancements", 3GPP TSG RAN WG1 #102-e, R1-2005774, e-Meeting, Aug. 17-28, 2020.
Spreadtrum Communications, "Discussion on feasibility and benefit of mode 2 enhancements", 3GPP TSG RAN WG1 #102-e, R1-2006268, e-Meeting, Aug. 17-28, 2020.
Extended European Search Report dated Aug. 14, 2023 received in European Patent Application No. EP20950612.0.
Fraunhofer HHI et al: "Resource Allocation Enhancements for Mode 2", 3GPP Draft; R1-2005537, 3rd Generation Partnership Project (3GPP), Mobile Competence Centre ; 650, Route Des Lucioles ; F-06921 Sophia-Antipolis Cedex;France, vol. RAN WG1, No. e-Meeting; Aug. 17, 2020-Aug. 28, 2020, Aug. 7, 2020 (Aug. 7, 2020), XP051914975.
LG Electronics: "Discussion on resource allocation mechanism for NR V2X",3GPP Draft; R1-1900650 Discussion on Resource Allocation Mechanism for NR V2X-LG, 3rd Generation Partnership Project (3GPP), Mobile Competence Centre ; 650, Route Des Lucioles ; F-06921 Sophia- Antipol, vol. RAN WG1, No. Taipei, Taiwan; Jan. 21, 2019-Jan. 25, 2019, Jan. 20, 2019 (Jan. 20, 2019), XP051593497.
Decision of Refusal issued by the China Patent Office for Chinese Patent Application No. 202310279170.7, mailed on Feb. 28, 2025. English translation attached.

* cited by examiner

WIRELESS COMMUNICATION METHOD AND TERMINAL DEVICE

CROSS-REFERENCE TO RELATED APPLICATION

The present application is a continuation of and claims priority to International Patent Application No. PCT/CN2020/111154, filed Aug. 25, 2020 and titled "WIRELESS COMMUNICATION METHODS AND TERMINAL DEVICES," which is incorporated herein by reference in its entirety.

TECHNICAL FIELD

The embodiments of the present disclosure relate to communication technology, and more particularly, to a wireless communication method and a terminal device.

BACKGROUND

In the New Radio Vehicle to Everything (NR-V2X) system, two transmission modes are defined: Mode 1 and Mode 2. In Mode 1, transmission resources of a terminal are allocated by a base station, and the terminal transmits data on a sidelink according to the resources allocated by the base station. In Mode 2, a terminal selects resources from a resource pool for data transmission.

In a transmission based on Mode 2, the terminal randomly selects transmission resources from a resource pool, or selects transmission resources according to a sensing result. This resource selection method can avoid interference between terminals to a certain extent, but there are other problems, such as data transmission interference caused by hidden nodes, resource waste caused by half-duplex, and power consumption caused by performing sensing by terminals, etc. Therefore, how to select resources to avoid or mitigate the above problems is a problem to be solved.

SUMMARY

Embodiments of the present disclosure provide a wireless communication method and a terminal device, capable of avoiding data transmission problems caused by hidden nodes and half-duplex in sidelink transmission.

In a first aspect, a wireless communication method is provided. The method includes: receiving, by a first terminal, first information transmitted by a second terminal. The first information is used by the first terminal to determine a resource for sidelink transmission. The first information includes at least one of: resource indication information indicating at least one transmission resource; time slot indication information indicating a reference time slot for the at least one transmission resource, or a time slot position of a resource selection time window corresponding to the at least one transmission resource; or a signal quality threshold used for determining a reference quality threshold for the at least one transmission resource.

In a second aspect, a wireless communication method is provided. The method includes: transmitting, by a second terminal, first information to a first terminal. The first information is used by the first terminal to determine a resource for sidelink transmission. The first information includes at least one of: resource indication information indicating at least one transmission resource; time slot indication information indicating a reference time slot for the at least one transmission resource, or a time slot position of a resource selection time window corresponding to the at least one transmission resource; or a signal quality threshold used for determining a reference quality threshold for the at least one transmission resource.

In a third aspect, a terminal device is provided. The terminal device is configured to perform the method according to the above first aspect or any possible implementation thereof. In particular, the terminal device includes one or more units configured to perform the method according to the above first aspect or any possible implementation thereof.

In a fourth aspect, a terminal device is provided. The terminal device is configured to perform the method according to the above second aspect or any possible implementation thereof. In particular, the terminal device includes one or more units configured to perform the method according to the above second aspect or any possible implementation thereof.

In a fifth aspect, a terminal device is provided. The terminal device includes a processor and a memory. The memory stores a computer program, and the processor is configured to invoke and execute the computer program stored in the memory to perform the method according to the above first aspect or any implementation thereof.

In a sixth aspect, a terminal device is provided. The terminal device includes a processor and a memory. The memory stores a computer program, and the processor is configured to invoke and execute the computer program stored in the memory to perform the method according to the above second aspect or any implementation thereof.

In a seventh aspect, a chip is provided. The chip is configured to perform the method according to the above first or second aspect or any implementation thereof.

In particular, the chip includes a processor configured to invoke and execute a computer program from a memory, to cause a device provided with the chip to perform the method according to the above first or second aspect or any implementation thereof.

In an eighth aspect, a computer-readable storage medium is provided. The computer-readable storage medium stores a computer program that causes a computer to perform the method according to the above first or second aspect or any implementation thereof.

In a ninth aspect, a computer program product is provided. The computer program product includes computer program instructions that cause a computer to perform the method according to the above first or second aspect or any implementation thereof.

In a tenth aspect, a computer program is provided. The computer program, when executed on a computer, causes the computer to perform the method according to the above first or second aspect or any implementation thereof.

Based on the above technical solutions, a terminal transmits assistance information to another terminal for the other terminal to select resources, which is beneficial to mitigating problems associated with hidden nodes and half-duplex in sidelink transmission.

DESCRIPTION OF EMBODIMENTS

Figure 1:
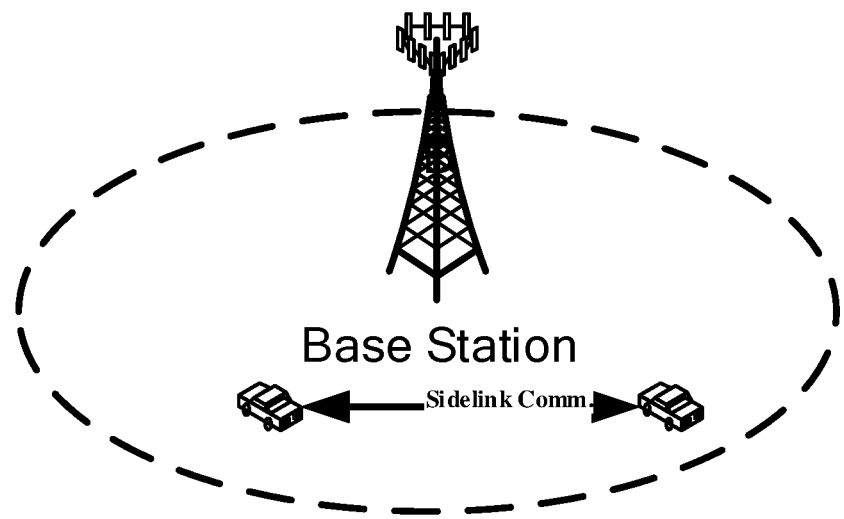
FIG. 1 is a schematic diagram showing sidelink communication within a network coverage according to the present disclosure.

The technical solutions in the embodiments of the present disclosure will be described below with reference to the figure in the embodiments of the present disclosure. Obviously, the described embodiments are only some embodiments, rather than all embodiments, of the present disclosure. All other embodiments obtained by those skilled in the art based on the embodiments in the present disclosure without inventive efforts are to be encompassed by the scope of the present disclosure.

The solutions according to the embodiments of the present disclosure can be applied to various communication systems, including for example: Global System of Mobile Communication (GSM), Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolved NR system, LTE-based access to unlicensed spectrum (LTE-U) system, NR-based access to unlicensed spectrum (NR-U) system, Non-Terrestrial Network (NTN) system, Universal Mobile Telecommunication System (UMTS), Wireless Local Area Networks (WLAN), Wireless Fidelity (WiFi), the $5^{th}$ Generation (5G) system, or other communication systems.

Generally, traditional communication systems can support a limited number of connections and are easy to implement. However, with the development of communication technology, mobile communication systems will support not only traditional communication, but also e.g., Device to Device (D2D) communication, Machine to Machine (M2M) communication, and Machine Type Communication (MTC), Vehicle to Vehicle (V2V) communication, Vehicle to everything (V2X) communication, etc. The embodiments of the present disclosure can also be applied to these communication systems.

Optionally, the communication system of an embodiment of the present disclosure may be applied to a Carrier Aggregation (CA) scenario, a Dual Connectivity (DC) scenario, a Standalone (SA) network deployment scenario, and the like.

Optionally, the communication system of an embodiment of the present disclosure may be applied to unlicensed spectrum or shared spectrum. Alternatively, the communication system of an embodiment of the present disclosure may be applied to licensed spectrum or non-shared spectrum.

The embodiments of the present disclosure are described in conjunction with a network device and a terminal device. The terminal device may refer to a User Equipment (UE), an access terminal, a user unit, a user station, a mobile station, a remote station, a remote terminal, a mobile device, a user terminal, a terminal, a wireless communication device, a user agent, or a user device. The terminal device may be a station (ST) in a WLAN, a cellular phone, a cordless phone, a Session Initiation Protocol (SIP) phone, a Wireless Local Loop (WLL) station, a Personal Digital Assistant (PDA) device, a handheld device or a computing device having a wireless communication function, another processing device connected to a wireless modem, a vehicle-mounted device, a wearable device, a terminal device in the next generation communication system (e.g., NR network), or a terminal device in a future evolved Public Land Mobile Network (PLMN), etc.

In the embodiments of the present disclosure, the terminal device can be deployed on land, including indoor or outdoor, handheld, worn, or vehicle-mounted, deployed on water (e.g., on a ship), or deployed in the air (e.g., on an airplane, a balloon, a satellite, etc.).

In the embodiments of the present disclosure, the terminal device may be a mobile phone, a tablet computer (Pad), a computer with a wireless transceiver function, a Virtual Reality (VR) terminal device, an Augmented Reality (AR) terminal device, a wireless terminal in industrial control, a wireless terminal device in self driving, a wireless terminal device in remote medical, a wireless terminal device in smart grid, a wireless terminal device in transportation safety, a wireless terminal device in smart city, or a wireless terminal device in smart home.

As non-limiting examples, in an embodiment of the present disclosure, the terminal device may also be a wearable device. The wearable device, also known as wearable smart device, is a general term for wearable devices that are intelligently designed and developed from everyday wear, such as glasses, gloves, watches, clothes, and shoes, by applying wearable technologies. A wearable device is a portable device that can be directly worn on or integrated into a user's clothes or accessories. A wearable device is not only a kind of hardware device, but can also provide powerful functions based on software support, data interaction, and cloud interaction. In a broad sense, wearable smart devices may include full-featured, large-sized devices that can provide full or partial functions without relying on smart phones, such as smart watches or smart glasses, and devices that only focus on a certain type of application function and need to cooperate with other devices such as smart phones for use, such as various smart bracelets and smart jewelries for physical sign monitoring.

In an embodiment of the present disclosure, the network device may be a device communicating with mobile devices. The network device may be an Access Point (AP) in a WLAN, a base station such as Base Transceiver Station (BTS) in a GSM system or a CDMA system, a base station such as NodeB (NB) in a WCDMA system, a base station such as Evolutional Node (eNB or eNodeB) in an LTE system, or a relay station, an access point, a vehicle-mounted device, a wearable device, a network device or base station (e.g., gNB) in an NR network, a network device in a future evolved PLMN, or a network device in an NTN.

As a non-limiting example, in an embodiment of the present disclosure, the network device may have mobile characteristics, e.g., the network device may be a mobile device. Optionally, the network device may be a satellite or a balloon station. For example, the satellite may be a Low Earth Orbit (LEO) satellite, a Medium Earth Orbit (MEO) satellite, a Geostationary Earth Orbit (GEO) satellite, a High Elliptical Orbit (HEO) satellite, etc. Optionally, the network device may also be a base station provided in a location such as land or water.

In the embodiment of the present disclosure, the network device may provide services for a cell, and the terminal device may communicate with the network device over transmission resources, e.g., frequency domain resources or frequency spectral resources, used in the cell. The cell may be a cell corresponding to the network device (e.g., base station). The cell may belong to a macro base station or a base station corresponding to a small cell. The small cell here may include a metro cell, a micro cell, a pico cell, a femto cell, or the like. These small cells have characteristics such as small coverage and low transmission power, and are suitable for providing high-rate data transmission services.

In addition, the terms "system" and "network" may often be used interchangeably herein. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

The terms used in the embodiments of the present disclosure are provided only for explaining the specific embodiments of the present disclosure, rather than limiting the present disclosure. The terms such as "first", "second", "third", "fourth", etc., as used in the description, claims and figures of the present disclosure are used for distinguishing different objects from each other, rather than defining a specific order. In addition, the terms such as "include" and "have" and any variants thereof are intended to cover non-exclusive inclusion.

It can be appreciated that the term "indication" as used in the embodiments of the present disclosure may be a direct indication, an indirect indication, or an association. For example, if A indicates B, it may mean that A directly indicates B, e.g., B can be obtained from A. Alternatively, it may mean that A indicates B indirectly, e.g., A indicates C and B can be obtained from C. Alternatively, it may mean that there is an association between A and B.

In the description of the embodiments of the present disclosure, the term "corresponding" may mean that there is a direct or indirect correspondence between the two, or may mean that there is an association between the two, or that they are in a relation of indicating and indicated, configuring or configured, or the like.

Figure 2:
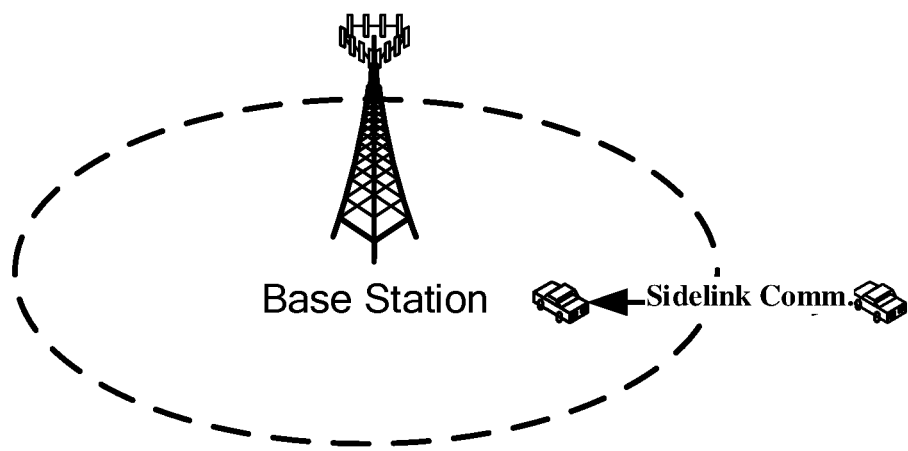
FIG. 2 is a schematic diagram showing sidelink communication with partial network coverage according to the present disclosure.
Figure 3:
FIG. 3 is a schematic diagram showing sidelink communication out of network coverage according to the present disclosure.

It should be noted that, depending on network coverage of communicating terminals, the sidelink communication can be divided into sidelink communication within network coverage, as shown in FIG. 1, sidelink communication with partial network coverage, as shown in FIG. 2, and sidelink communication out of network coverage, as shown in FIG. 3.

In FIG. 1, in the sidelink communication within network coverage, all terminals performing the sidelink communication are within the coverage of one base station. Therefore, the terminals can receive configuration signaling from the base station and perform the sidelink communication based on the same sidelink configuration.

In FIG. 2, in the sidelink communication with partial network coverage, some of terminals performing the sidelink communication are within the coverage of the base station, and these terminals can receive configuration signaling from the base station, and perform sidelink communication according to the configuration by the base station. Terminals out of the network coverage cannot receive the configuration signaling from the base station. In this case, the terminals out of the network coverage may determine the sidelink configuration according to pre-configuration information and information carried in Physical Sidelink Broadcast Channel (PSBCH) transmitted by terminals within the network coverage, so as to perform the sidelink communication.

In FIG. 3, for the sidelink communication out of network coverage, all terminals performing the sidelink communication are out of the network coverage, and all the terminals determine the sidelink configuration according to pre-configuration information, so as to perform the sidelink communication.

It should be noted that Device to Device (D2D) communication is a Sidelink (SL) transmission technology based on D2D, which is different from the traditional cellular system where communication data is received or transmitted via a base station and thus has a higher spectral efficiency and a lower transmission delay. The V2X system adopts the scheme of direct D2D communication, for which two transmission modes are defined in 3GPP, i.e., Mode 1 and Mode 2. The embodiments of the present disclosure may be applied to Mode 1 and/or Mode 2.

In Mode 1, transmission resources of a terminal are allocated by a base station, and the terminal transmits data on a sidelink according to the resources allocated by the base station. The base station can allocate resources for a single transmission to the terminal, or can allocate semi-static transmission resources to the terminal. As shown in FIG. 1, the terminal is located within the network coverage, and the network allocates transmission resources for sidelink transmission to the terminal.

In Mode 2, a terminal selects a resource from a resource pool for data transmission. As shown in FIG. 3, the terminal is located out of the cell coverage, and the terminal autonomously selects transmission resources from a preconfigured resource pool for sidelink transmission. Alternatively, as shown in FIG. 1, the terminal autonomously selects transmission resources from a resource pool configured by the network for sidelink transmission.

It should be noted that, in NR-V2X, a user may be in a mixed mode, that is, using both Mode 1 and Mode 2 for obtaining resources.

In NR-V2X, autonomous driving is supported, and thus higher requirements are imposed on data interaction between vehicles, such as higher throughput, lower latency, higher reliability, larger coverage, more flexible resource allocation, etc.

Figure 4:
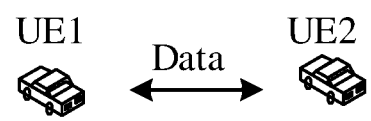
FIG. 4 is a schematic diagram showing unicast sidelink communication according to the present disclosure.
Figure 5:
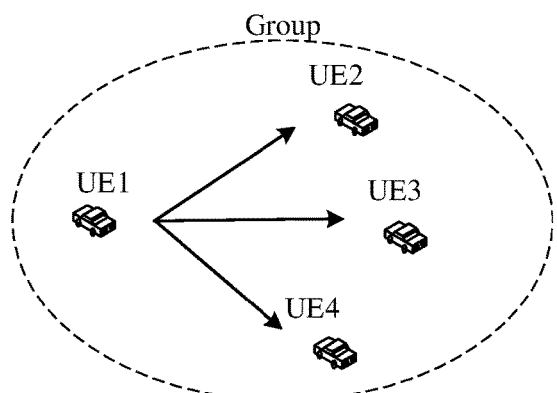
FIG. 5 is a schematic diagram showing multicast sidelink communication according to the present disclosure.
Figure 6:
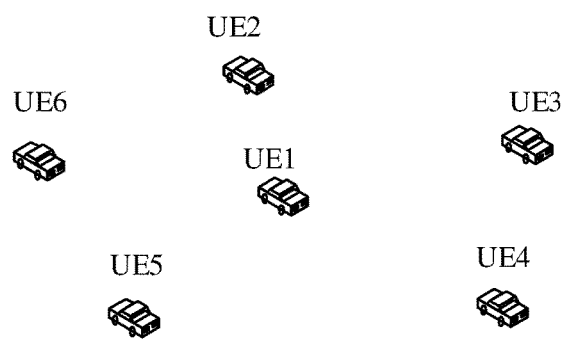
FIG. 6 is a schematic diagram showing broadcast sidelink communication according to the present disclosure.

In Long Term Evolution Vehicle to Everything (LTE-V2X), broadcast transmission is supported, and in NR-V2X, unicast and multicast transmissions are introduced. For unicast transmission, there is only one terminal at the receiving end. As shown in FIG. 4, unicast transmission is performed between UE1 and UE2. For multicast transmission, the receiving end is all terminals in a communication group, or all terminals within a transmission distance. As shown in FIG. 5, UE1, UE2, UE3 and UE4 form a communication group, in which UE1 transmits data, and other terminal devices in the group are receiving terminals. For broadcast transmission, the receiving end could be any terminal surrounding the transmitting terminal. As shown in FIG. 6, UE1 is the transmitting terminal, and other surrounding terminals, UE2-UE6, are all receiving terminals.

A resource pool is introduced in the sidelink transmission system. The so-called resource pool is a set of transmission resources, whether configured by the network or selected autonomously by a terminal. One or more resource pools can be pre-configured or configured by the network. The resource pool may be further divided into a transmission resource pool and a reception resource pool. The transmission resource pool means that the transmission resources in the resource pool are used for transmitting sidelink data, and the reception resource pool means that the transmission resources in the resource pool are used by the terminal for receiving sidelink data.

Figure 7:
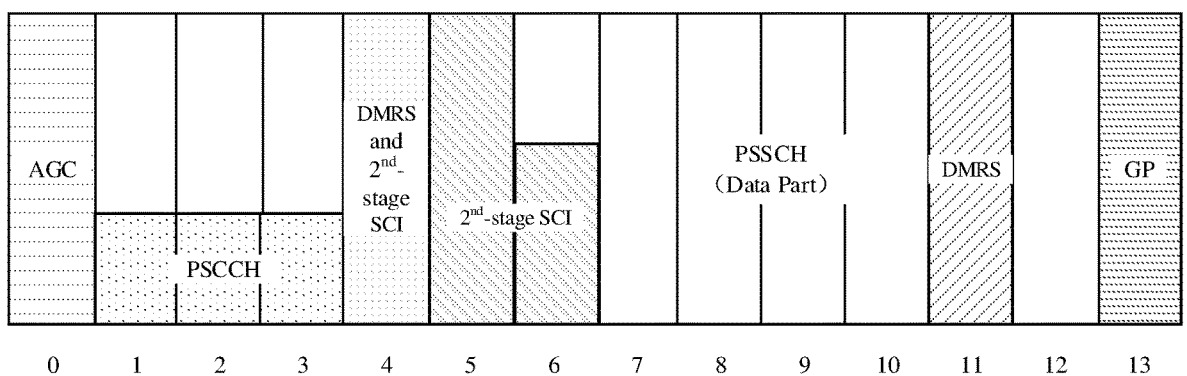
FIG. 7 is a schematic diagram showing frame structures of PSCCH and PSSCH according to the present disclosure.

Two-stage Sidelink Control Information (SCI) is introduced in NR-V2X. The first-stage SCI is carried in a Physical Sidelink Control Channel (PSCCH) for indicating information such as transmission resource for a Physical Sidelink Shared Channel (PSSCH), reserved resource information, Modulation and Coding Scheme (MCS) level, and priority. The second-stage SCI is transmitted in a PSSCH resource and is demodulated using a Demodulation Reference Signal (DMRS) for PSSCH, for indicating information for data demodulation, such as Source Identity (ID), Destination ID, Hybrid Automatic Repeat reQuest (HARQ) ID, and New Data Indicator (NDI). The second-stage SCI is mapped from the first DMRS symbol of the PSSCH, first in frequency domain and then in time domain. As shown in FIG. 7, the PSCCH occupies 3 symbols (Symbol 1, Symbol 2, and Symbol 3), the DMRS for PSSCH occupies Symbol 4 and Symbol 11, and the second-stage SCI is mapped from Symbol 4 where it is frequency division multiplexed with the DMRS. The second-stage SCI is mapped to Symbol 4, Symbol 5, and Symbol 6. The size of the resources occupied by the second-stage SCI depends on the number of bits in the second-stage SCI.

In the above transmission scheme in Mode 2, the terminal selects transmission resources from a resource pool randomly or according to a sensing result. This resource selection scheme can avoid interference between terminals to a certain extent, but there are also the following problems.

Figure 8:
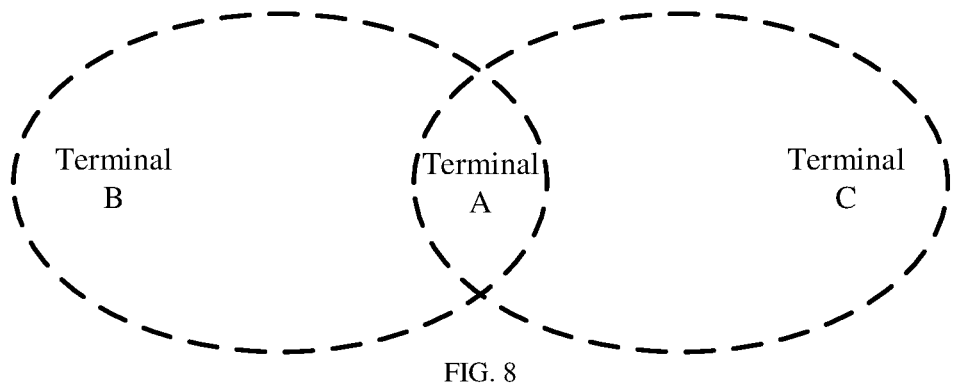
FIG. 8 is a schematic diagram showing sidelink transmission based on Mode 2.

Hidden node problem: As shown in FIG. 8, Terminal B selects a resource based on sensing, and uses the resource to transmit sidelink data to Terminal A. Because Terminal B and Terminal C are far apart, they cannot detect each other's transmission. Therefore, B and C may select the same transmission resource, and the data transmitted by Terminal C will interfere with the data transmitted by Terminal B, resulting in the hidden node problem.

Half-duplex problem: When a terminal selects a transmission resource by performing sensing, if the terminal transmits sidelink data on a certain time slot within the sensing window, due to the limitation of half-duplex, the terminal cannot receive any data transmitted by other terminals in this time slot, and there is no sensing result. Therefore, when the terminal performs resource exclusion, it will exclude all resources corresponding to this time slot in the selection window to avoid interference with other terminals. Due to the limitation of half-duplex, the terminal excludes many resources that do not need to be excluded.

Power consumption problem: In the above sensing process, the terminal needs to continuously sense resources to determine which resources are available, and the terminal needs to consume a lot of energy for continuous resource sensing. This is not a problem for a vehicle-mounted terminal which has a power supply. However, for a handheld terminal, excessive power consumption will cause the terminal to run out of power quickly. Therefore, how to reduce the power consumption of the terminal is also a problem that needs to be considered in the resource selection process.

In view of the above technical problems, a resource selection scheme is provided, in which a terminal transmits assistance information to another terminal for the other terminal to select resources, thereby avoiding or mitigating the above problems to some extent.

The technical solutions of the present disclosure will described in detail below with reference to specific embodiments.

Figure 9:
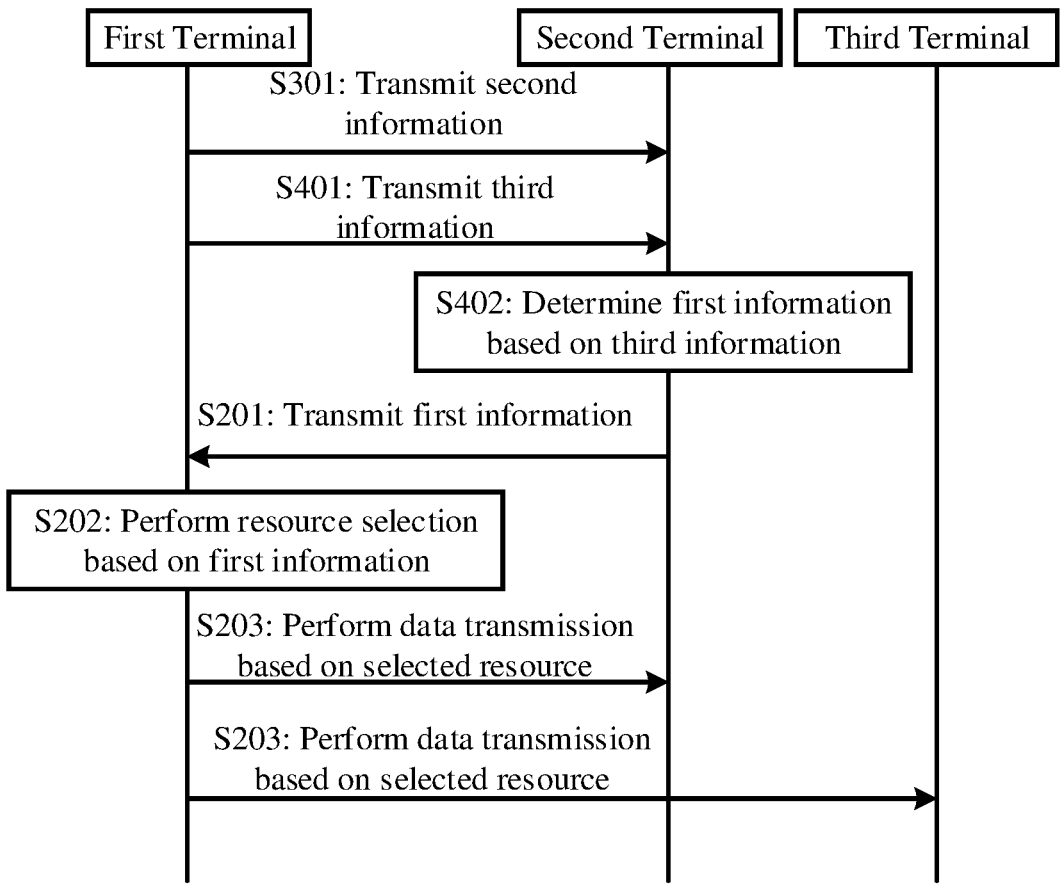
FIG. 9 is a schematic interaction diagram illustrating a wireless communication method according to an embodiment of the present disclosure.

FIG. 9 is a schematic interaction diagram of a wireless communication method 100 according to an embodiment of the present disclosure. As shown in FIG. 9, the method 100 may include at least some of the following contents.

Embodiment 1

At S201, a first terminal receives first information transmitted by a second terminal. The first information is used by the first terminal for resource selection.

That is, in this embodiment of the present disclosure, the first terminal may select resources according to assistance information (e.g., the first information) transmitted by another terminal (e.g., the second terminal), which is beneficial to avoiding the above problems.

Optionally, in some embodiments, the first information may be carried in at least one of the following signaling:
SCI, PC5-Radio Resource Control (RRC) signaling, or Media Access Control (MAC) Control Element (MAC CE).

Optionally, in some other embodiments, the first information may be carried in other sidelink signaling, or when there is sidelink data to be transmitted, the first information may be transmitted along with the sidelink data.

Optionally, the SCI is first-stage SCI or a second-stage SCI. The first-stage SCI is transmitted via a PSCCH, and the second-stage SCI is transmitted over a PSSCH transmission resource.

As a specific example, the first information may be carried in information bits in the SCI.

Optionally, in some embodiments, the first information may include at least one of:
resource indication information indicating at least one transmission resource;
time slot indication information indicating a reference time slot for the at least one transmission resource, or a time slot position of a resource selection time window corresponding to the at least one transmission resource; or
a signal quality threshold used for determining a reference quality threshold for the at least one transmission resource.

It can be appreciated that the at least one transmission resource may be continuous transmission resources or discrete transmission resources, and the present disclosure is not limited to any of these examples.

It should be noted that the time slot indication information can be understood as time domain reference information indicating a time domain reference position of the transmission resource, in units of time slots or other time units such as subframes, symbols, System Frame Numbers (SFNs), etc.

In the following description, the units of time slots will be used, but the present disclosure is not limited to this.

Optionally, in some embodiments, the resource indication information may be used for determining at least one of:
- a set of available resources;
- a set of unavailable resources;
- a specific transmission resource that is a transmission resource for the first terminal determined by the second terminal;
- a first set of transmission resources that is determined by the second terminal according to sensing results of time slots in a first set of time slots, the first set of time slots including time slots selected or reserved by the terminal for sidelink transmission;
- a second set of transmission resources that is determined by the second terminal according to sensing results of timeslots in a second set of timeslots, the second set of timeslots including timeslots in which the first terminal transmits sidelink data; and
- a subband size that is a subband size used when the second terminal performs resource sensing.

Optionally, the set of available resources may be determined by the second terminal by performing sensing. After determining the set of available resources, the second terminal transmits the set of available resources to the first terminal to assist the first terminal in resource selection. For example, the first terminal may select a resource from the set of available resources, such that the hidden node problem can be avoided.

Optionally, the set of unavailable resources may be determined by the second terminal by performing sensing. After determining the set of unavailable resources, the second terminal transmits the set of unavailable resources to the first terminal. Therefore, when the first terminal selects a resource, it can avoid selecting a resource in the set of unavailable resources, such that the hidden node problem can be avoided.

Optionally, the specific transmission resource may be a transmission resource to be used by the first terminal as determined by the second terminal. That is, the second terminal may directly allocate a sidelink transmission resource to the first terminal. In some embodiments, after receiving the information on the specific transmission resource, the first terminal can directly use the specific transmission resource to perform sidelink transmission.

Optionally, the second terminal may be a group head terminal, and the first terminal may be a group member of a group managed by the group head terminal. Specifically, in multicast communication, the group head terminal can allocate sidelink transmission resources to group member terminals. For example, the group head terminal may allocate transmission resources of different time slots to group member terminals, thereby avoiding the half-duplex problem in data transmission between group member terminals. That is, when one group member terminal transmits data, other group member terminals can receive the data.

Optionally, in some embodiments, the first terminal may transmit to the second terminal information on a set of time slots for sensing, such as the first set of time slots or the second set of time slots. Further, the second terminal may perform sensing on a time slot in the first set of time slots or the second set of time slots, and determine the first set of transmission resources or the second set of transmission resources according to the sensing result, and then transmit the first set of transmission resources or the second set of transmission resources to the first terminal. In this way, when performing resource selection on the first set of time slots or the second set of time slots, the first terminal can refer to the information on the first set of transmission resources or the second set of transmission resources, which is beneficial to avoiding the above hidden node problem and half-duplex problem.

Optionally, the subband size may be the subband size when the second terminal performs resource sensing.

Optionally, the subband size may be configured via the first information, or the subband size may be pre-configured, or configured by a network device, in which case the first information may not include this parameter.

It can be appreciated that, in the embodiments of the present disclosure, the transmission resources are described in units of subbands only in the frequency domain, and of course other frequency domain units may be used as units, and the present disclosure is not limited to this.

Optionally, in some embodiments, the time slot indication information may include at least one of:
- first time slot indication information used for determining a first reference time slot that is a reference start time slot of the at least one transmission resource or is a starting position of the resource selection time window for the at least one transmission resource, the at least one transmission resource being a transmission resource in the resource selection time window; or
- second time slot indication information used for determining a second reference time slot that is a reference end time slot of the at least one transmission resource or is an ending position of the resource selection time window for the at least one transmission resource, the at least one transmission resource being a transmission resource in the resource selection time window.

That is, the first reference time slot and/or the second reference time slot may be configured by via first information.

Optionally, in other embodiments, the first reference time slot and/or the second reference time slot may be predefined, or configured by a network device. In this case, the first information may not include the first time slot indication information and/or the second time slot indication information.

It can be appreciated that, in the embodiment of the present disclosure, "pre-configured" or "pre-defined" may be implemented by pre-storing corresponding codes, tables, or other means that can indicate relevant information in devices (for example, including the terminal device and the network device). The present disclosure is not limited to any of these specific implementations. For example, pre-defined may refer to defined in a protocol.

In the embodiment of the present disclosure, the "protocol" may refer to a standard protocol in the communication field, for example, including the LTE protocol, the NR protocol, and related protocols applied in future communication systems, and the present disclosure is not limited to any of these examples.

Optionally, in some embodiments, the signal quality threshold may be, for example, a Reference Signal Receiving Power (RSRP) threshold, a Reference Signal Receiving Quality (RSRQ) threshold, a Reference Signal Signal to Interference plus Noise Ratio (RS-SINR) threshold, etc.

When the signal quality threshold is an RSRP threshold as an example, an optional scheme for determining the RSRP threshold will be described.

When the second terminal is performing sensing, it needs to compare a measured RSRP with an initial RSRP threshold. If the number of transmission resources in the set of available resources determined according to the initial RSRP threshold is smaller than a first ratio X %, then the initial RSRP threshold can be increased by 3 dB, and the resource exclusion process is performed again. The RSRP threshold is the RSRP threshold used when determining the final set of available resources, for example, the corresponding threshold after the initial RSRP threshold is raised by 3 dB.

Optionally, in some embodiments, the initial RSRP threshold may be determined based on a priority carried in a received PSCCH and priority information used for sensing.

It can be appreciated that the embodiment of the present disclosure is not limited to any specific indication scheme for the resource indication information and the time slot indication information. Hereinafter, some optional indication schemes will be described with reference to specific examples.

Scheme 1: The resource indication information may include number information of the at least one transmission resource, and the number information of each transmission resource may indicate one of a plurality of transmission resources.

For example, the plurality of transmission resources may include K*(N−L+1) transmission resources, where K is a number of time slots, N is a total number of subbands included in a frequency domain, and L is a number of subbands included in each transmission resource, and N, K, and L are positive integers.

Optionally, the K time slots may be continuous or discrete, and the present disclosure is not limited to this.

Optionally, the N subbands may be the total number of subbands included in a carrier, in a Bandwidth Part (BWP), or in a resource pool, and the present disclosure is not limited to this. The resource pool here may be a resource pool for the first terminal.

Optionally, in some embodiments, K may be pre-configured; or K may be configured by a network device.

Optionally, in other embodiments, the K time slots may be determined according to the first reference time slot and/or the second reference time slot, or according to the first set of time slots or according to the second set of time slots.

For example, the K time slots may include time slots within a time window determined from the first reference time slot and the second reference time slot.

In another example, the time slots included in the first set of time slots or the second set of time slots constitute the K time slots.

An example is given to illustrate a specific indication scheme. For example, according to the first reference time slot and the second reference time slot, a time window with a time slot range of [n+1, n+100] is determined, and the resources in the time window are numbered. Assuming that the frequency-domain size of each transmission resource is L subbands, the subbands [0, L−1] in time slot n+1 correspond to resource number 1, the subbands [0, L−1] in time slot n+2 correspond to resource number 2, the subbands [0, L−1] in time slot n+3 correspond to resource number 3, and so on, the subbands [0, L−1] in time slot n+100 correspond to resource number 100, then the subbands [1, L] in time slot n+1 correspond to resource number 101, the subbands [1, L] in time slot n+2 correspond to resource number 102, and so on. That is, the numbering is performed first in the time domain, and then in the frequency domain. Then, the resource indication information included in the first information may be number information of the transmission resources.

It can be appreciated that in other embodiments, other numbering schemes may be used to number the transmission resources. For example, the numbering may be performed first in the frequency domain, and then in the time domain. The present disclosure is not limited to this.

Optionally, the number information of the transmission resources included in the first information may be number information of available transmission resources, or may be number information of unavailable transmission resources.

Scheme 2:

The resource indication information may include S bitmaps, where S is a number of time slots. Each of the S bitmaps corresponds to one time slot, and each bitmap indicates an availability of a transmission resource in the corresponding time slot.

In some embodiments, each bitmap may include (N−L+1) bits each corresponding to one transmission resource, each transmission resource includes L subbands, and one bit in each bitmap indicates whether the corresponding transmission resource in the corresponding time slot is available, where N is a total number of subbands included in a frequency domain, and L is a number of subbands included in each transmission resource, and N, S and L are positive integers.

Optionally, the S time slots may be continuous or discrete, and the present disclosure is not limited to this.

Optionally, the N subbands may be the total number of subbands included in a carrier, in a Bandwidth Part (BWP), or in a resource pool, and the present disclosure is not limited to this. The resource pool here may be a resource pool for the first terminal.

In some embodiments, the S time slots may be determined from the first set of time slots or the second set of time slots.

In other embodiments, the S time slots may be determined according to the first reference time slot and the second reference time slot. For example, the S time slots may include time slots within a time window determined from the first reference time slot and the second reference time slot.

In a specific implementation, a time window with a time slot range of [n+1, n+100] may be determined according to the first time slot indication information and the second time slot indication information. For each time slot, a bitmap of (N−L+1) bits can indicate the availability of each transmission resource on the time slot. For example, the subband range of the transmission resource corresponding to the first bit in the (N−L+1) bit is [0, L−1], the subband range of the transmission resource corresponding to the second bit is [1, L], the subband range of the transmission resource corresponding to the third bit is [2, L+1], and so on. Then a total of 100*(N−L+1) bits are required to indicate whether each of all the transmission resources in the time window is available.

In another specific implementation, the S time slots may be determined according to the first set of time slots (or the second set of time slots), and the first information transmitted by the second terminal to the first terminal may include S bitmaps each corresponding to one of the S time slots, and each bitmap indicates the availability of the transmission resource on the corresponding one time slot.

In yet another specific implementation, the first information transmitted by the second terminal to the first terminal may include S bitmaps, which correspond to S time slots, respectively. The reference time slot of the S time slots can be, for example, the first reference time slot (or the second reference time slot) as described above, and then the S bitmaps can indicate the availability of transmission resources on the S time slots starting from the first reference time slot, respectively.

Optionally, S may be a preconfigured parameter, or a parameter configured by a network device, or the first information may include a parameter S, where S is a positive integer.

Optionally, in some embodiments of the present disclosure, the method 100 may further include:

At S202, the first terminal performs resource selection according to the first information.

For example, the first terminal may select a resource from the set of available resources, the first set of transmission resources, or the second set of transmission resources in the first information as a target resource.

In another example, the first terminal may exclude resources in the set of unavailable resources in the first information when performing resource selection.

In another example, the first terminal may select the specific transmission resource in the first information as a target resource.

Therefore, by transmitting assistance information from one terminal to another terminal to assist the resource selection by the other terminal, the hidden node problem can be solved, and the problem of lack of sensing result on some time slots due to the half-duplex problem can be avoided.

Further, in some embodiments of the present disclosure, the method 100 may further include:

The first terminal performs data transmission according to the selected resource.

For example, the first terminal may transmit sidelink data to the second terminal or another terminal, e.g., a third terminal, according to the selected resource.

Embodiment 2

At S301, the first terminal transmits second information to the second terminal. The first information is transmitted based on an indication of the second information.

That is, the second terminal may transmit the first information to the first terminal based on the indication from the first terminal, so as to assist the first terminal in resource selection.

Optionally, in some embodiments, the operation of transmitting, by the first terminal, the second information to the second terminal may include:

transmitting, by the first terminal, the second information to the second terminal when resource selection or resource reselection is required.

For example, when the first terminal has sidelink data to be transmitted, or a condition for resource reselection is met, the first terminal needs to perform resource selection (or resource reselection). In this case, the first terminal may transmit the second information to the second terminal, instructing the second terminal to transmit the first information to the first terminal, so as to assist the first terminal in resource selection.

It can be appreciated that the above resource selection or resource reselection may also include resource reselection due to re-evaluation and pre-emption mechanisms.

Optionally, in some other embodiments, the operation of transmitting, by the first terminal, the second information to the second terminal may include:

transmitting, by the first terminal, the second information to the second terminal periodically.

For example, when the first terminal needs to periodically select transmission resources, the first terminal may periodically transmit the second information to the second terminal.

Optionally, in some other embodiments, the operation of transmitting, by the first terminal, the second information to the second terminal may include:

transmitting, by the first terminal, the second information to the second terminal when a first timer expires.

Specifically, when the first terminal transmits the second information to the second terminal, a first timer is started, and when the first timer expires, the first terminal retransmits the second information to the second terminal.

Optionally, the second information may include first indication information indicating whether a receiving end of the second information needs to transmit the first information.

Optionally, the second information may further include second indication information and/or third indication information, the second indication information indicating whether the first information needs to be transmitted periodically, and the third indication information indicating a period parameter for transmitting the first information periodically.

Optionally, the first indication information may be carried in at least one of:

SCI, PC5-RRC signaling, or a resource request message for requesting a sidelink resource.

Optionally, the resource request message may be, for example, a sidelink Scheduling Request (SR) or a sidelink Buffer Status Report (BSR).

Optionally, the SCI may be, for example, first-stage SCI or second-stage SCI.

As an example, the first indication information may be indicated by an information bit in the SCI. For example, the SCI may include 1 bit indicating whether the receiving end needs to transmit the first information.

As another example, the first indication information may be indicated by a mask sequence of the SCI.

Specifically, after the SCI passes a Cyclical Redundancy Check (CRC), different mask sequences can be used to indicate whether the receiving end needs to transmit the second information.

Optionally, the receiving end here may refer to the receiving end of the SCI, or the receiving end of data scheduled by the SCI.

For example, a correspondence between mask sequences and the first indication information is shown in Table 1 below:

TABLE 1

| Mask Sequence $\langle x_{mask,\ 0},$ $x_{mask,\ 1}, \ldots, x_{mask,\ 15}\rangle$ | First Indication Information |
| --- | --- |
| <0, 0, 0, 0, 0, 0, 0, 0, 0, 0, 0, 0, 0, 0, 0, 0> | Not Transmit First Information |
| <1, 1, 1, 1, 1, 1, 1, 1, 1, 1, 1, 1, 1, 1, 1, 1> | Transmit First Information |

It should be noted that the embodiment of the present disclosure is not limited to any specific mask sequence, and other mask sequences may be used to distinguish different indications from each other.

The specific process is as follows:

The information bits of the SCI can be expressed as: $a_0$, $a_1, a_2, a_3, \ldots, a_{A-1}$, and the CRC check bits are $p_0, p_1, p_2, p_3, \ldots, p_{L-1}$, where A represents the length of the information bits, and L represents the length of the check bits. The bit sequence after adding CRC is expressed as $b_0, b_1, b_2, b_3, \ldots, b_{B-1}$, where B=A+L, $b_k=a_k$, for k=0, 1, 2, . . . , A−31, or $b_k=p_{k-A}$, for k=A, A+1, A+2, . . . , A+L−1.

The sequence after adding CRC is further masked with a mask sequence, e.g., the mask sequence given in Table 1, and the sequence after masking is $c_0, c_1, c_2, c_3, \ldots, c_{B-1}$, where:

$C_k=b_k$, for k=0, 1, 2, . . . , A−1, or $c_k=(b_k+x_{mask,k-A})$mod 2, for k=A, A+1, A+2, . . . , A+15.

After receiving the SCI, the receiving end uses different mask sequences (such as the two mask sequences in Table 1) to detect the SCI respectively. If the SCI is detected successfully using the first mask sequence (all-0 sequence), it indicates that the receiving end does not need to transmit the first information. If the SCI is detected successfully using the second mask sequence (all-1 sequence), it indicates that the receiving end needs to transmit the first information.

In some embodiments, the PC5-RRC signaling may be PC5-RRC signaling used for information exchange in the process of establishing a unicast or multicast link between the first terminal and the second terminal. That is, the first terminal and the second terminal may exchange the first indication information in the process of establishing the link.

Optionally, the second indication information may be carried in at least one of:
SCI, PC5-RRC signaling, or a resource request message for requesting a sidelink resource.

As an example, an information bit in the SCI may indicate whether the receiving end needs to transmit the first information periodically, or in other words, whether it needs to transmit the first information for one single time or transmit the first information periodically.

As another example, the mask sequence of the SCI may indicate whether the receiving end needs to transmit the first information periodically, or in other words, whether it needs to transmit the first information for one single time or transmit the first information periodically.

For example, the correspondence between mask sequences and the second indication information is shown in Table 2 or Table 3 below:

TABLE 2

| Mask Sequence $\langle x_{mask, 0}, x_{mask, 1}, \ldots, x_{mask, 15} \rangle$ | Second Indication Information |
| --- | --- |
| <0, 0, 0, 0, 0, 0, 0, 0, 0, 0, 0, 0, 0, 0, 0, 0> | First information to be transmitted for one single time |
| <1, 1, 1, 1, 1, 1, 1, 1, 1, 1, 1, 1, 1, 1, 1, 1> | First information to be transmitted periodically |

TABLE 3

| Mask Sequence $\langle x_{mask, 0}, x_{mask, 1}, \ldots, x_{mask, 15} \rangle$ | Second Indication Information: whether first information is to be transmitted periodically |
| --- | --- |
| <0, 0, 0, 0, 0, 0, 0, 0, 0, 0, 0, 0, 0, 0, 0, 0> | No |
| <1, 1, 1, 1, 1, 1, 1, 1, 1, 1, 1, 1, 1, 1, 1, 1> | Yes |

Optionally, in some embodiments, the third indication information may be carried in at least one of:
SCI, PC5-RRC signaling, or a resource request message for requesting a sidelink resource.

Optionally, in some embodiments, each period parameter may correspond to an index value, and a correspondence between period parameters and index values may be pre-configured, or configured by a network device. Table 4 shows an optional correspondence between the period parameters and the index values.

TABLE 4

| Index Value | 0 | 1 | 2 | 3 | 4 | 5 | 6 | 7 |
| --- | --- | --- | --- | --- | --- | --- | --- | --- |
| Period Parameter (No. of time slots) | 0 | 1 | 2 | 3 | 4 | 8 | 16 | 32 |

For the specific indication, it is only necessary to include the index value corresponding to a target period parameter in specific signaling. For example, when the period parameter for transmitting the first information is indicated by the SCI, the index value corresponding to the target period parameter may be carried in the SCI.

Optionally, when the period parameter is 0, it means that the first information is only reported for one single time, that is, periodic reporting is not supported.

Optionally, in an embodiment of the present disclosure, the first indication information, the second indication information, and the third indication information may be carried in same or different information. For example, the first indication information and the second indication information may be carried in the SCI, and the third indication information may be carried in PC5-RRC signaling. Alternatively, the first indication information, the second indication information, and the third indication information may all be carried in the SCI. For example, the first indication information may be carried in the first-stage SCI, and the index value in Table 4 may be carried in the second-stage SCI. When the index value is 0, it means one single reporting, and when the index value is another value, it indicates periodic reporting, and the corresponding period parameter can be determined according to the index value.

Embodiment 3

At S401, the first terminal transmits third information to the second terminal, the third information being used by the second terminal to determine the first information.

That is, the first terminal may transmit assistance information to the second terminal, so as to assist the second terminal to perform sensing to determine the first information.

Optionally, in some embodiments, the third information may include at least one of:
information on a resource pool for the first terminal;
a first set of time slots, including time slots selected or reserved by the first terminal for sidelink transmission;

a second set of time slots, including time slots in which the first terminal transmits sidelink data;

fourth indication information used for determining a number of transmission resources included in the first information;

fifth indication information used for determining a number of transmission resources required by the first terminal for sidelink transmission;

sixth indication information used for determining a ratio of a number of transmission resources included in the first information to a total number of transmission resources in a specific set of transmission resources;

priority information that is a priority for the second terminal to perform sensing;

Packet Delay Budget (PDB) information;

first time slot indication information used for determining a reference start time slot of the resource indication information, or a starting position of the resource selection time window; or second time slot indication information used for determining a reference end time slot of the resource indication information, or an ending position of the resource selection time window.

Specifically, when terminals use preconfigured resource pool information, the transmission resource pools for all terminals are the same. When terminals use resource pools configured by the network, the transmission resource pools for different terminals may be different. In this case, when the second terminal transmits the first information to the first terminal to assist the first terminal in resource selection, the first information should be determined according to the information on the resource pool for the first terminal. Therefore, the first terminal needs to transmit the information on the resource pool for the first terminal to the second terminal. For example, the network configures a first transmission resource pool for the first terminal, and configures a second transmission resource pool for the second terminal, the first terminal transmits information on the first transmission resource pool to the second terminal, and the second terminal determines a set of available resources in the transmission resource pool for the first terminal, and transmits the set of available resources to the first terminal, such that the first terminal can determine the transmission resource in the set of available resources. Otherwise, if the transmission resources in the set of available resources transmitted by the second terminal to the first terminal do not belong to the transmission resource pool for the first terminal, the first terminal cannot use the transmission resources.

As a non-limiting example, the information on the resource pool for the first terminal may include at least one of:

time domain resource indication information used for determining a time domain resource bitmap for the resource pool for the first terminal;

subband size indicating a number of Physical Resource Blocks (PRBs) included in a subband;

a start PRB position, such as, the lowest PRB index of the subband for the lowest subband index in the resource pool;

a number of subbands included in frequency domain resources in the resource pool; or resource reservation period indication information used for determining a resource reservation period value allowed by the resource pool for the first terminal.

It can be appreciated that the first set of time slots and the second set of time slots in Embodiment 3 correspond to the first set of time slots and the second set of time slots in Embodiment 1, respectively. That is, the first terminal can configure the resource for performing sensing for the second terminal, and the second terminal can perform sensing on the resource to determine the first set of transmission resources or the second set of transmission resources, and further transmit the first set of transmission resources or the second set of transmission resources to the first terminal, so as to assist the first terminal in resource selection.

For the fourth indication information, the second terminal may determine, according to the fourth indication information, the number of transmission resources included in the first information transmitted to the first terminal, for example, the number of transmission resources indicated in the resource indication information.

For the fifth indication information, the second terminal may determine, according to the fifth indication information, the number of transmission resources required by the first terminal, and may further determine the minimum number of transmission resources that need to be included in the first information.

For the sixth indication information, it indicates a first ratio threshold, that is, the ratio of the number of transmission resources included in the first information to the total number of transmission resources in the specific set of transmission resources needs to be greater than or equal to the first proportion threshold.

Optionally, the first time slot indication information and the second time slot indication information in Embodiment 3 may correspond to the first time slot indication information and the second time slot indication information in Embodiment 1, respectively. The first time slot indication information and the second time slot indication information may be used for determining the position and size of the resource selection time window, or for determining the reference time slot for the transmission resource indicated by the resource indication information.

Optionally, the specific set of transmission resources may be transmission resources corresponding to the resource selection time window, transmission resources in the first set of time slots, or transmission resources in the second set of time slots, etc. The present disclosure is not limited to this.

For the priority information, the second terminal may perform sensing according to the priority information, and the priority information may be, for example, priority information carried in a PSCCH to be transmitted by the first terminal, or a priority corresponding to sidelink data to be transmitted by the first terminal.

For the PDB information, the second terminal may determine the size of the resource selection time window according to the PDB information, further determine the set of available resources within the resource selection time window, and include the set of available resources in the first information for transmission to the first terminal, so as to assist the first terminal in resource selection.

Optionally, the PDB information may be determined according to PDB information or remaining PDB information corresponding to sidelink data to be transmitted by the first terminal.

Optionally, in some embodiments, the third information may be carried in at least one of: SCI, PC5-RRC signaling, or MAC CE. Of course, it can also be carried in other sidelink signaling, and the present disclosure is not limited to this.

Further, in some embodiments, the method 100 may further include:

At S402, the second terminal determines the first information according to the third information.

For the specific implementation, reference can be made to the above related description, which will not be repeated here.

It can be appreciated that the above Embodiment 1, Embodiment 2, and Embodiment 3 may be implemented independently, or may be implemented in combination, and the present disclosure is not limited to this. For example, the second terminal may transmit the first information in response to receiving the second information, or the second information may be determined according to the third information transmitted by the first terminal, etc.

Optionally, in an embodiment of the present disclosure, if the terminal has sidelink data to be transmitted, the first information, the second information, and the third information may be transmitted along with the data to be transmitted. Otherwise, the first information, the second information, or the third information may be transmitted via SCI or PSSCH MAC CE.

Optionally, in some embodiments of the present disclosure, when the second terminal transmits the first information, its corresponding priority is a first priority.

Optionally, the first priority may be a priority level that is pre-configured, or configured by a network.

Optionally, in some embodiments of the present disclosure, when the first terminal transmits the second information, its corresponding priority is a second priority.

Optionally, the second priority may be a priority level that is pre-configured, or configured by a network.

Optionally, in some embodiments of the present disclosure, when the first terminal transmits the third information, its corresponding priority is a third priority.

Optionally, the third priority may be a priority level that is pre-configured, or configured by a network.

Optionally, the first priority, the second priority, and the third priority may be a same priority level.

Optionally, when the first information is transmitted along with sidelink data, a priority carried in a PSCCH may be a higher one of the first priority and a priority of the sidelink data. The PSCCH is a PSCCH scheduling the sidelink data.

Optionally, when the second information is transmitted along with sidelink data, a priority carried in a PSCCH may be a higher one of the second priority and a priority of the sidelink data. The PSCCH is a PSCCH scheduling the sidelink data.

Optionally, when the third information is transmitted along with sidelink data, a priority carried in a PSCCH is a higher one of the third priority and a priority of the sidelink data. The PSCCH is a PSCCH scheduling the sidelink data.

To summarize, the first terminal transmits indication information to the second terminal, and transmits assistance information to the second terminal to assist the second terminal to perform resource sensing. The information on the set of resources transmitted by the second terminal to the first terminal can assist the first terminal in resource selection, thereby solving the hidden node problem and avoiding the problem that the first terminal has no sensing result on some time slots due to the half-duplex operation mode.

The method embodiments of the present disclosure have been described in detail above with reference to FIG. 9, and the apparatus embodiments of the present disclosure will be described in detail below with reference to FIGS. 10 to 13. It can be appreciated that the apparatus embodiments and the method embodiments correspond to each other, and for similar description, reference can be made to the method embodiments.

Figure 10:
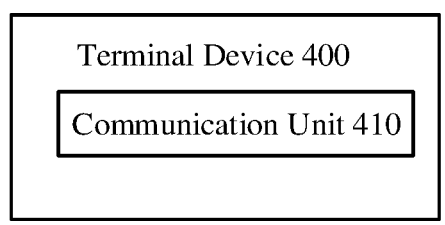
FIG. 10 is a schematic block diagram of a terminal device according to an embodiment of the present disclosure.

FIG. 10 shows a schematic block diagram of a terminal device 400 according to an embodiment of the present disclosure. As shown in FIG. 10, the terminal device 400 includes:

a communication unit 410 configured to first information transmitted by a second terminal, the first information being used by the terminal device to determine a resource for sidelink transmission, the first information including at least one of:

resource indication information indicating at least one transmission resource;

time slot indication information indicating a reference time slot for the at least one transmission resource, or a time slot position of a resource selection time window corresponding to the at least one transmission resource; or a signal quality threshold used for determining a reference quality threshold for the at least one transmission resource.

Optionally, in some embodiments, the resource indication information may include at least one of:

a set of available resources;

a set of unavailable resources;

a specific transmission resource that is a transmission resource for the terminal device determined by the second terminal;

a first set of transmission resources that is determined by the second terminal according to sensing results of time slots in a first set of time slots, the first set of time slots including time slots selected or reserved by the terminal for sidelink transmission;

a second set of transmission resources that is determined by the second terminal according to sensing results of timeslots in a second set of timeslots, the second set of timeslots including timeslots in which the terminal device transmits sidelink data; or a subband size that is a subband size used when the second terminal performs resource sensing.

Optionally, in some embodiments, the time slot indication information may include at least one of:

first time slot indication information used for determining a first reference time slot that is a reference start time slot of the at least one transmission resource or is a starting position of the resource selection time window for the at least one transmission resource, the at least one transmission resource being a transmission resource in the resource selection time window; or second time slot indication information used for determining a second reference time slot that is a reference end time slot of the at least one transmission resource or is an ending position of the resource selection time window for the at least one transmission resource, the at least one transmission resource being a transmission resource in the resource selection time window.

Optionally, in some embodiments, the resource indication information may include number information of the at least one transmission resource, and the number information of each transmission resource may indicate one of a plurality of transmission resources.

Optionally, in some embodiments, the plurality of transmission resources include $K*(N-L+1)$ transmission resources, where K is a number of time slots, N is a total number of subbands included in a frequency domain, and L is a number of subbands included in each transmission resource.

Optionally, in some embodiments, K may be preconfigured; or K may be configured by a network device.

Optionally, in some embodiments, the resource indication information may include S bitmaps, where S is a number of time slots, each of the S bitmaps corresponds to one time slot, each bitmap includes (N−L+1) bits each corresponding to one transmission resource, each transmission resource includes L subbands, and one bit in each bitmap indicates whether the corresponding transmission resource in the corresponding time slot is available, where N is a total number of subbands included in a frequency domain, and L is a number of subbands included in each transmission resource.

Optionally, in some embodiments, S may be determined according to the first set of time slots; or S may be determined according to the second set of time slots.

Optionally, in some embodiments, the first information may be carried in at least one of:

Sidelink Control Information (SCI), PC5-Radio Resource Control (RRC) signaling, or Medium Access Control (MAC) Control Element (CE).

Optionally, in some embodiments, the communication unit 410 may be further configured to:

transmit second information to the second terminal, the first information being transmitted based on an indication of the second information.

Optionally, in some embodiments, the second information may include first indication information indicating whether the second terminal needs to transmit the first information.

Optionally, in some embodiments, the first indication information may be carried in at least one of:

SCI, PC5-RRC signaling, or a resource request message for requesting a sidelink resource.

Optionally, the first indication information may be carried in an information bit in the SCI or a mask sequence of the SCI.

Optionally, in some embodiments, the second information may further include second indication information and/or third indication information, the second indication information indicating whether the first information needs to be transmitted periodically, and the third indication information indicating a period parameter for transmitting the first information periodically.

Optionally, in some embodiments, the second indication information may be carried in at least one of:

SCI, PC5-RRC signaling, or a resource request message for requesting a sidelink resource.

Optionally, the second indication information may be carried in an information bit in the SCI or a mask sequence of the SCI.

Optionally, in some embodiments, the third indication information may be carried in at least one of:

SCI, PC5-RRC signaling, or a resource request message for requesting a sidelink resource.

Optionally, in some embodiments, each period parameter may correspond to an index value, and the third indication information may indicate an index value corresponding to a target period parameter.

Optionally, in some embodiments, the communicating unit 410 may be configured to:

transmit the second information to the second terminal when resource selection or resource reselection is required; or transmit the second information to the second terminal periodically; or transmit the second information to the second terminal when a first timer expires.

Optionally, in some embodiments, the communication unit 410 may be further configured to:

transmit third information to the second terminal, the third information being used by the second terminal to determine the second information.

Optionally, in some embodiments, the third information may include at least one of:

information on a resource pool for the terminal device;

a first set of time slots, including time slots selected or reserved by the terminal device for sidelink transmission;

a second set of time slots, including time slots in which the terminal device transmits sidelink data;

fourth indication information used for determining a number of transmission resources included in the first information;

fifth indication information used for determining a number of transmission resources required by the terminal device for sidelink transmission;

sixth indication information used for determining a ratio of a number of transmission resources included in the first information to a total number of transmission resources in a specific set of transmission resources;

priority information that is a priority for the second terminal to perform sensing;

Packet Delay Budget (PDB) information;

first time slot indication information used for determining a reference start time slot of the resource indication information, or a starting position of the resource selection time window; or second time slot indication information used for determining a reference end time slot of the resource indication information, or an ending position of the resource selection time window.

Optionally, the specific set of transmission resources may include transmission resources determined according to at least one of: the first set of time slots, the second set of time slots, the first time slot indication information, or the second time slot indication information.

Optionally, in some embodiments, the priority information may be priority information carried in a Physical Sidelink Control Channel (PSCCH) to be transmitted by the terminal device, or a priority corresponding to sidelink data to be transmitted by the terminal.

Optionally, in some embodiments, the PDB information may be determined according to PDB information or remaining PDB information corresponding to sidelink data to be transmitted by the terminal device.

Optionally, in some embodiments, the information on the resource pool for the terminal device may include at least one of:

time domain resource indication information used for determining a time domain resource bitmap for the resource pool for the terminal device;

subband size indicating a number of Physical Resource Blocks (PRBs) included in a subband;

a start PRB position;

a number of subbands included in frequency domain resources in the resource pool; or resource reservation period indication information used for determining a resource reservation period value allowed by the resource pool for the terminal device.

Optionally, in some embodiments, the third information may be carried in at least one of: SCI, PC5-RRC signaling, or MAC CE.

Optionally, in some embodiments, a priority of the first information may be a first priority that is pre-configured, or configured by a network device.

Optionally, in some embodiments, when the first information is transmitted along with sidelink data, a priority carried in a PSCCH may be a higher one of the first priority and a priority of the sidelink data.

Optionally, in some embodiments, a priority of the second information may be a second priority that is pre-configured, or configured by a network device.

Optionally, in some embodiments, when the second information is transmitted along with sidelink data, a priority carried in a PSCCH may be a higher one of the second priority and a priority of the sidelink data.

Optionally, in some embodiments, the priority of the first information and the priority of the second information may be same.

Optionally, in some embodiments, a priority of the third information may be a third priority that is pre-configured, or configured by a network device.

Optionally, in some embodiments, when the third information is transmitted along with sidelink data, a priority carried in a PSCCH may be a higher one of the third priority and a priority of the sidelink data.

Optionally, in some embodiments, the priority of the first information and the priority of the third information may be same.

Optionally, in some embodiments, the above communication unit may be a communication interface or a transceiver, or an input/output interface of a communication chip or a system-on-chip.

It can be appreciated that the terminal device 400 according to the embodiment of the present disclosure may correspond to the first terminal in the method embodiment of the present disclosure, and the above and other operations and/or functions of the respective units in the terminal device 400 are provided for the purpose of implementing the process flow corresponding to the first terminal in the method 100 shown in FIG. 9, and details thereof will be not omitted here for brevity.

Figure 11:
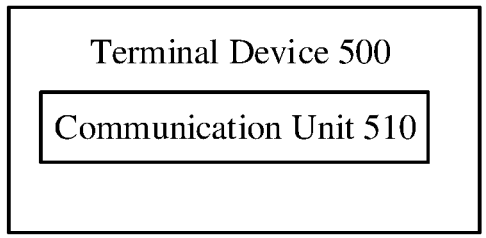
FIG. 11 is a schematic block diagram of a terminal device according to another embodiment of the present disclosure.

FIG. 11 is a schematic block diagram showing a terminal device according to an embodiment of the present disclosure. The terminal device 500 in FIG. 11 includes a communication unit 510 configured to transmit first information to a first terminal, the first information being used by the first terminal to determine a resource for sidelink transmission, the first information including at least one of:
- resource indication information indicating at least one transmission resource;
- time slot indication information indicating a reference time slot for the at least one transmission resource, or a time slot position of a resource selection time window corresponding to the at least one transmission resource; or
- a signal quality threshold used for determining a reference quality threshold for the at least one transmission resource.

Optionally, in some embodiments, the resource indication information may include at least one of:
- a set of available resources;
- a set of unavailable resources;
- a specific transmission resource that is a transmission resource for the first terminal determined by the terminal device;
- a first set of transmission resources that is determined by the terminal device according to sensing results of time slots in a first set of time slots, the first set of time slots including time slots selected or reserved by the terminal for sidelink transmission;
- a second set of transmission resources that is determined by the terminal device according to sensing results of timeslots in a second set of timeslots, the second set of timeslots including timeslots in which the first terminal transmits sidelink data; or
- a subband size that is a subband size used when the terminal device performs resource sensing.

Optionally, in some embodiments, the time slot indication information may include at least one of:
- first time slot indication information used for determining a first reference time slot that is a reference start time slot of the at least one transmission resource or is a starting position of the resource selection time window for the at least one transmission resource, the at least one transmission resource being a transmission resource in the resource selection time window; or
- second time slot indication information used for determining a second reference time slot that is a reference end time slot of the at least one transmission resource or is an ending position of the resource selection time window for the at least one transmission resource, the at least one transmission resource being a transmission resource in the resource selection time window.

Optionally, in some embodiments, the resource indication information may include number information of the at least one transmission resource, and the number information of each transmission resource may indicate one of a plurality of transmission resources.

Optionally, the plurality of transmission resources may include $K*(N-L+1)$ transmission resources, where K is a number of time slots, N is a total number of subbands included in a frequency domain, and L is a number of subbands included in each transmission resource.

Optionally, in some embodiments, K may be preconfigured; or K may be configured by a network device.

Optionally, in some embodiments, the resource indication information may include S bitmaps, where S is a number of time slots, each of the S bitmaps corresponds to one time slot, each bitmap includes $(N-L+1)$ bits each corresponding to one transmission resource, each transmission resource includes L subbands, and one bit in each bitmap indicates whether the corresponding transmission resource in the corresponding time slot is available, where N is a total number of subbands included in a frequency domain, and L is a number of subbands included in each transmission resource.

Optionally, S may be determined according to the first set of time slots; or S may be determined according to the second set of time slots.

Optionally, in some embodiments, the first information may be carried in at least one of:
Sidelink Control Information (SCI), PC5—Radio Resource Control (RRC) signaling, or Medium Access Control (MAC) Control Element (CE).

Optionally, in some embodiments, the communication unit 510 may be further configured to: receive second information transmitted by the first terminal, wherein the first information is transmitted based on an indication of the second information.

Optionally, in some embodiments, the second information may include first indication information indicating whether the terminal device needs to transmit the first information.

Optionally, in some embodiments, the first indication information may be carried in at least one of:
SCI, PC5-RRC signaling, or a resource request message for requesting a sidelink resource.

Optionally, the first indication information is carried in an information bit in the SCI or a mask sequence of the SCI.

Optionally, in some embodiments, the second information may further include second indication information and/or third indication information, the second indication information indicating whether the first information needs to be transmitted periodically, and the third indication information indicating a period parameter for transmitting the first information periodically.

Optionally, in some embodiments, the second indication information may be carried in at least one of:
SCI, PC5-RRC signaling, or a resource request message for requesting a sidelink resource.

Optionally, the second indication information may be carried in an information bit in the SCI or a mask sequence of the SCI.

Optionally, in some embodiments, the third indication information may be carried in at least one of:
SCI, PC5-RRC signaling, or a resource request message for requesting a sidelink resource.

Optionally, in some embodiments, each period parameter may correspond to an index value, and the third indication information may indicate an index value corresponding to a target period parameter.

Optionally, a correspondence between the period parameter and the index value may be pre-configured, or configured by a network device.

Optionally, the communication unit 510 may be further configured to: receive third information transmitted by the first terminal, and the terminal device 500 may further include: a processing unit configured to determine the second information according to the third information.

Optionally, the third information may include at least one of:
information on a resource pool for the first terminal;
a first set of time slots, including time slots selected or reserved by the first terminal for sidelink transmission;
a second set of time slots, including time slots in which the first terminal transmits sidelink data;
fourth indication information used for determining a number of transmission resources included in the first information;
fifth indication information used for determining a number of transmission resources required by the first terminal for sidelink transmission;
sixth indication information used for determining a ratio of a number of transmission resources included in the first information to a total number of transmission resources in a specific set of transmission resources;
priority information that is a priority for the terminal device to perform sensing;
Packet Delay Budget (PDB) information;
first time slot indication information used for determining a reference start time slot of the resource indication information, or a starting position of the resource selection time window; or
second time slot indication information used for determining a reference end time slot of the resource indication information, or an ending position of the resource selection time window.

Optionally, in some embodiments, the specific set of transmission resources may include transmission resources determined according to at least one of: the first set of time slots, the second set of time slots, the first time slot indication information, or the second time slot indication information.

Optionally, in some embodiments, the priority information may be priority information carried in a Physical Sidelink Control Channel (PSCCH) to be transmitted by the first terminal, or a priority corresponding to sidelink data to be transmitted by the terminal.

Optionally, in some embodiments, the PDB information may be determined according to PDB information or remaining PDB information corresponding to sidelink data to be transmitted by the first terminal.

Optionally, in some embodiments, the information on the resource pool for the first terminal may include at least one of:
time domain resource indication information used for determining a time domain resource bitmap for the resource pool for the first terminal;
subband size indicating a number of Physical Resource Blocks (PRBs) included in a subband;
a start PRB position;
a number of subbands included in frequency domain resources in the resource pool; or
resource reservation period indication information used for determining a resource reservation period value allowed by the resource pool for the first terminal.

Optionally, the third information may be carried in at least one of: SCI, PC5-RRC signaling, or MAC CE.

Optionally, in some embodiments, a priority of the first information may be a first priority that is pre-configured, or configured by a network device.

Optionally, in some embodiments, when the first information is transmitted along with sidelink data, a priority carried in a PSCCH may be a higher one of the first priority and a priority of the sidelink data.

Optionally, in some embodiments, a priority of the second information may be a second priority that is pre-configured, or configured by a network device.

Optionally, in some embodiments, when the second information is transmitted along with sidelink data, a priority carried in a PSCCH may be a higher one of the second priority and a priority of the sidelink data.

Optionally, in some embodiments, the priority of the first information and the priority of the second information may be same.

Optionally, in some embodiments, a priority of the third information may be a third priority that is pre-configured, or configured by a network device.

Optionally, in some embodiments, when the third information is transmitted along with sidelink data, a priority carried in a PSCCH may be a higher one of the third priority and a priority of the sidelink data.

Optionally, in some embodiments, the priority of the first information and the priority of the third information may be same.

Optionally, in some embodiments, the above communication unit may be a communication interface or a transceiver, or an input/output interface of a communication chip or a system-on-chip. The aforementioned processing unit may be one or more processors.

It can be appreciated that the terminal device 500 according to the embodiment of the present disclosure may correspond to the second terminal in the method embodiment of the present disclosure, and the above and other operations and/or functions of the respective units in the terminal device 500 are provided for the purpose of implementing the process flow corresponding to the second terminal in the method 100 shown in FIG. 9, and details thereof will be not omitted here for brevity.

Figure 12:
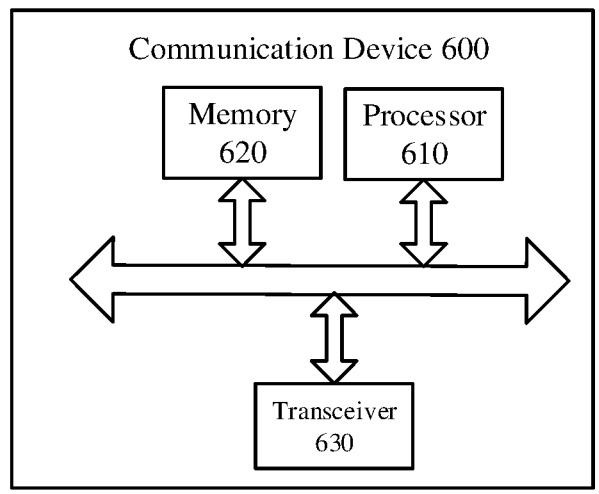
FIG. 12 is a schematic block diagram of a communication device according to another embodiment of the present disclosure.

FIG. 12 is a schematic diagram showing a structure of a communication device 600 according to an embodiment of the present disclosure. The communication device 600 shown in FIG. 12 includes a processor 610, and the processor 610 can invoke and execute a computer program from a memory to implement the method in the embodiment of the present disclosure.

Optionally, as shown in FIG. 12, the communication device 600 may further include a memory 620. The processor 610 can invoke and execute a computer program from the memory 620 to implement the method in the embodiment of the present disclosure.

The memory 620 may be a separate device independent from the processor 610, or may be integrated in the processor 610.

Optionally, as shown in FIG. 12, the communication device 600 may further include a transceiver 630, and the processor 610 may control the transceiver 630 to communicate with other devices, and in particular, transmit information or data to other devices, or receive information or data transmitted by other devices.

Here, the transceiver 630 may include a transmitter and a receiver. The transceiver 630 may further include one or more antennas.

Optionally, the communication device 600 may specifically be the network device according to the embodiment of the present disclosure, and the communication device 600 may implement the corresponding processes implemented by the network device in any of the methods according to the embodiments of the present disclosure. For the sake of brevity, details thereof will be omitted here.

Optionally, the communication device 600 may specifically be the first terminal or second terminal according to the embodiment of the present disclosure, and the communication device 600 may implement the corresponding processes implemented by the first terminal or second terminal in any of the methods according to the embodiments of the present disclosure. For the sake of brevity, details thereof will be omitted here.

Figure 13:
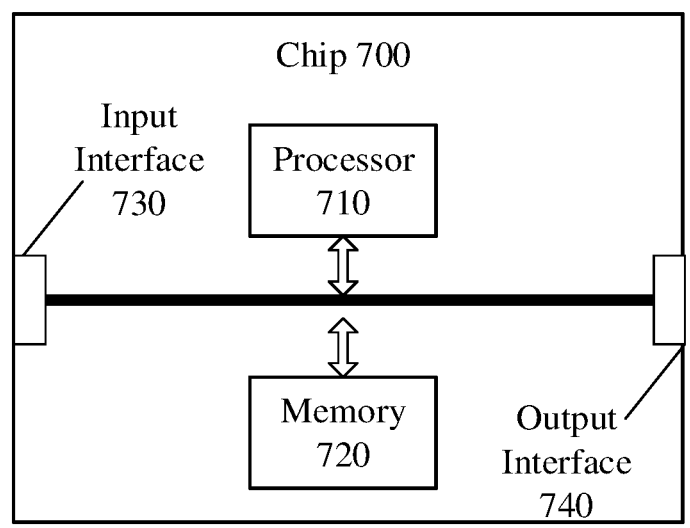
FIG. 13 is a schematic block diagram of a chip according to an embodiment of the present disclosure.

FIG. 13 is a schematic diagram showing a structure of a chip according to an embodiment of the present disclosure. The chip 700 shown in FIG. 13 includes a processor 710, and the processor 710 can invoke and execute a computer program from a memory to implement the method in the embodiment of the present disclosure.

Optionally, as shown in FIG. 13, the chip 700 may further include a memory 720. The processor 710 can invoke and execute a computer program from the memory 720 to implement the method in the embodiment of the present disclosure.

The memory 720 may be a separate device independent from the processor 710, or may be integrated in the processor 710.

Optionally, the chip 700 may further include an input interface 730. The processor 710 can control the input interface 730 to communicate with other devices or chips, and in particular, obtain information or data transmitted by other devices or chips.

Optionally, the chip 700 may further include an output interface 740. The processor 710 can control the output interface 740 to communicate with other devices or chips, and in particular, output information or data to other devices or chips.

Optionally, the chip can be applied to the network device in the embodiment of the present disclosure, and the chip can implement the corresponding processes implemented by the network device in the various methods of the embodiments of the present disclosure. For the sake of brevity, details thereof will be omitted here.

Optionally, the chip can be applied to the first terminal or second terminal in the embodiment of the present disclosure, and the chip can implement the corresponding processes implemented by the first terminal or second terminal in the various methods of the embodiments of the present disclosure. For the sake of brevity, details thereof will be omitted here.

Optionally, the chip in the embodiment of the present disclosure may also be referred to as a system-level chip, a system-chip, a chip system, or a system-on-chip.

It is to be noted that the processor in the embodiment of the present disclosure may be an integrated circuit chip with signal processing capability. In an implementation, the steps of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

It can be appreciated that the memory in the embodiments of the present disclosure may be a volatile memory or a non-volatile memory, or may include both volatile and non-volatile memories. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As illustrative, rather than limiting, examples, many forms of RAMs are available, including Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer readable storage medium storing a computer program.

Optionally, the computer readable storage medium can be applied to the network device in the embodiment of the present disclosure, and the computer program can cause a computer to perform corresponding procedures implemented by the network device in the method according to any of the embodiments of the present disclosure. Details thereof will be omitted here for simplicity.

Optionally, the computer readable storage medium can be applied to the first terminal or second terminal in the embodiment of the present disclosure, and the computer program can cause a computer to perform corresponding procedures implemented by the first terminal or second terminal in the method according to any of the embodiments of the present disclosure. Details thereof will be omitted here for simplicity.

An embodiment of the present disclosure also provides a computer program product including computer program instructions.

Optionally, the computer program product can be applied to the network device in the embodiment of the present disclosure, and the computer program instructions can cause a computer to perform corresponding procedures implemented by the network device in the method according to any of the embodiments of the present disclosure. Details thereof will be omitted here for simplicity.

Optionally, the computer program product can be applied to the first terminal or second terminal in the embodiment of the present disclosure, and the computer program instructions can cause a computer to perform corresponding procedures implemented by the first terminal or second terminal in the method according to any of the embodiments of the present disclosure. Details thereof will be omitted here for simplicity.

An embodiment of the present disclosure also provides a computer program.

Optionally, the computer program can be applied to the network device in the embodiment of the present disclosure. The computer program, when executed on a computer, can cause the computer to perform corresponding procedures implemented by the network device in the method according to any of the embodiments of the present disclosure. Details thereof will be omitted here for simplicity.

Optionally, the computer program can be applied to the first terminal or second terminal in the embodiment of the present disclosure. The computer program, when executed on a computer, can cause the computer to perform corresponding procedures implemented by the first terminal or second terminal in the method according to any of the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer readable storage medium. Based on this understanding, all or part of the technical solutions according to the embodiments of the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

While the specific embodiments of the present disclosure have been described above, the scope of the present disclosure is not limited to these embodiments. Various variants and alternatives can be made by those skilled in the art without departing from the scope of the present disclosure. These variants and alternatives are to be encompassed by the scope of present disclosure as defined by the claims as attached.

What is claimed is:

1. A wireless communication method, comprising:
receiving, by a first terminal, first information transmitted by a second terminal, the first information being used by the first terminal to determine a resource for sidelink transmission, the first information comprising at least one of:
resource indication information indicating at least one transmission resource; or
time slot indication information indicating a reference time slot for the at least one transmission resource;

wherein the method further comprises:
transmitting, by the first terminal, second information to the second terminal, wherein the first information is transmitted based on an indication of the second information;
wherein the second information comprises first indication information indicating whether the second terminal needs to transmit the first information;
wherein the method further comprises:
transmitting, by the first terminal, third information to the second terminal, the third information being used by the second terminal to determine the first information; wherein
when the third information is transmitted along with sidelink data, a priority carried in a PSCCH is a higher one of a priority of the third information and a priority of the sidelink data.

2. The method according to claim 1, wherein the resource indication information comprises at least one of:
a set of available resources; or
a set of unavailable resources.

3. The method according to claim 1, wherein the time slot indication information comprises at least one of:
first time slot indication information used for determining a first reference time slot that is a reference start time slot of the at least one transmission resource.

4. The method according to claim 1, wherein the first information is carried in at least one of:
Sidelink Control Information (SCI) or Medium Access Control (MAC) Control Element (CE).

5. The method according to claim 1, wherein the first indication information is carried in SCI, wherein the first indication information is carried in an information bit in the SCI or a mask sequence of the SCI.

6. The method according to claim 1, wherein the third information comprises at least one of:
priority information that is a priority for the second terminal to perform sensing;
first time slot indication information used for determining a starting position of the resource selection time window; or
second time slot indication information used for determining an ending position of the resource selection time window.

7. The method according to claim 6, wherein the priority information is priority information carried in a Physical Sidelink Control Channel (PSCCH) to be transmitted by the first terminal, or a priority corresponding to sidelink data to be transmitted by the first terminal.

8. The method according to claim 1, wherein the third information is carried in at least one of: SCI, PC5-RRC signaling, or MAC CE.

9. The method according to claim 1, wherein a priority of the first information is a first priority that is pre-configured, or predefined.

10. The method according to claim 1, wherein a priority of the second information is a second priority that is pre-configured, or predefined.

11. The method according to claim 10, wherein a priority of the first information and the priority of the second information are same.

12. The method according to claim 1, wherein the priority of the third information is a third priority that is pre-configured, or predefined.

13. A wireless communication method, comprising:
transmitting, by a second terminal, first information to a first terminal, the first information being used by the first terminal to determine a resource for sidelink transmission, the first information comprising at least one of:
resource indication information indicating at least one transmission resource; or
time slot indication information indicating a reference time slot for the at least one transmission resource;
wherein the method further comprises:
receiving, by the second terminal, second information from the first terminal, wherein the first information is transmitted based on an indication of the second information;
wherein the second information comprises first indication information indicating whether the second terminal needs to transmit the first information;
wherein the method further comprises:
receiving, by the second terminal, third information form the first terminal, the third information being used by the second terminal to determine the first information; wherein
when the third information is transmitted along with sidelink data, a priority carried in a PSCCH is a higher one of a priority of the third information and a priority of the sidelink data.

14. The method according to claim 13, wherein said transmitting, by the second terminal, first information to the first terminal comprises:
when there is sidelink data to be transmitted for the second terminal, transmitting, by the second terminal, the first information along with the sidelink data to the first terminal.

15. A terminal device, comprising a processor and a memory, wherein the memory has a computer program store thereon, and the processor is configured to invoke and execute the computer program stored in the memory to perform the method according to claim 13.

16. The method according to claim 13, wherein a priority of the first information is a first priority that is pre-configured, or predefined.

17. The method according to claim 13, wherein a priority of the second information is a second priority that is pre-configured, or predefined.

18. A terminal device, comprising a processor and a memory, wherein the memory has a computer program stored thereon, and the processor is configured to invoke and execute the computer program stored in the memory to perform:
receive first information transmitted by a second terminal, the first information being used by the terminal device to determine a resource for sidelink transmission, the first information comprising at least one of:
resource indication information indicating at least one transmission resource; or
time slot indication information indicating a reference time slot for the at least one transmission resource;
the processor further performs:
transmitting second information to the second terminal, wherein the first information is transmitted based on an indication of the second information;
wherein the second information comprises first indication information indicating whether the second terminal needs to transmit the first information;
and the processor further performs:
transmitting third information to the second terminal, the third information being used by the second terminal to determine the first information; wherein when the third information is transmitted along with sidelink data, a priority carried in a PSCCH is a higher one of a priority of the third information and a priority of the sidelink data.

\* \* \* \* \*